United States Patent [19]
Walworth

[11] 3,948,284
[45] Apr. 6, 1976

[54] RISING-PLUG PLUG VALVE

[75] Inventor: Charles Joseph Walworth, Pinconning, Mich.

[73] Assignee: The Dow Chemical Company, Midland, Mich.

[22] Filed: Aug. 19, 1974

[21] Appl. No.: 498,697

[52] U.S. Cl. ................ 137/238; 137/375; 251/161
[51] Int. Cl.² ............................................ F16K 5/02
[58] Field of Search .......................... 137/237–241; 251/161, 187, 188

[56] References Cited
UNITED STATES PATENTS

| | | | |
|---|---|---|---|
| 286,656 | 10/1883 | VanWie | 137/238 |
| 876,625 | 1/1908 | DeRemer | 137/238 |
| 1,778,746 | 10/1930 | Bard | 251/161 X |
| 2,315,058 | 3/1943 | Holt et al. | 137/240 X |
| 3,406,707 | 10/1968 | Schenck | 137/375 |
| 3,636,971 | 1/1972 | Hagar | 137/238 |

Primary Examiner—Martin P. Schwadron
Assistant Examiner—Richard Gerard
Attorney, Agent, or Firm—Robert B. Ingraham

[57] ABSTRACT

In a rising-plug plug valve wherein the plug and valve body at the narrow end of the plug define a cavity, a passage is provided between the cavity and the outlet opening of the plug valve. On opening, the valve plug and seat portion adjacent the narrowest portion of the plug is flushed by liquid passing therebetween and the outlet opening of the passageway.

5 Claims, 2 Drawing Figures

RISING-PLUG PLUG VALVE

Plug valves have been particularly desirable valves for shut-off use for many years. However, as the size of the plug valve increases, oftentimes the amount of torque required to operate the valve also increases. In order to overcome this high torque requirement, a so-called rising-plug plug valve was developed. In a rising-plug plug valve, generally there is a mechanism provided which raises the frustoconical plug from its seat, maintains the plug either out of contact with the seat or in very light contact with the seat, permitting the plug to be rotated using minimal torque. The plug is then seated by forcing it into the frustoconical seat. Often, such rising-plug plug valves are subject to substantial abrasion, particularly in the region of the plug adjacent its narrower end which engages the frustoconical cavity within the valve body. Generally, such rising-plug plug valves tend to accumulate particulate material carried by the liquid flowing within the valve in the cavity defined by the smaller diameter end of the plug and the valve body. Oftentimes such particulate matter abrades the sealing surfaces of the plug and valve body. Occasionally, such a particulate matter will accumulate to a sufficient extent that the plug can no longer be successfully seated.

It would be desirable if there were an improved rising-plug plug valve which was more tolerant of particulate solids than the present rising-plug plug valves.

It would be also desirable if an improved valve could be readily prepared from existing valves.

It would also be desirable if there were available an improved plastic lined rising-plug plug valve.

These benefits and other advantages in accordance with the present invention are achieved in an improved rising-plug plug valve comprising a valve body, the valve body defining an inlet opening, an outlet opening and a passage therein, the passage providing full communication between the inlet opening and the outlet opening, the valve body defining a plug receiving cavity having a generally frustoconical configuration, the plug receiving cavity intersecting the passageway between the inlet and the outlet, a plug disposed within the plug receiving cavity, the plug having a general frustoconical configuration and mating with at least a portion of the walls of the plug receiving cavity, the plug defining a fluid passageway which on rotation of the plug permits selective communication between the inlet and the outlet end, the plug having an end of major diameter and an end of minor diameter, the plug and valve body at the plug end of minor diameter defining a closed cavity, a means to selectively position the plug in the sealing engagement with the walls defining the plug receiving cavity and means to rotate the plug, the improvement which comprises providing a passageway between the cavity defined by the plug and body and the outlet passageway.

In a particularly advantageous embodiment of the invention, the passageway is partly defined by an external surface of the plug and partly defined by a surface of the body.

Further features and advantages of the present invention will become more apparent from the present specification taken in connection with the drawing wherein.

Figures 1, 2:
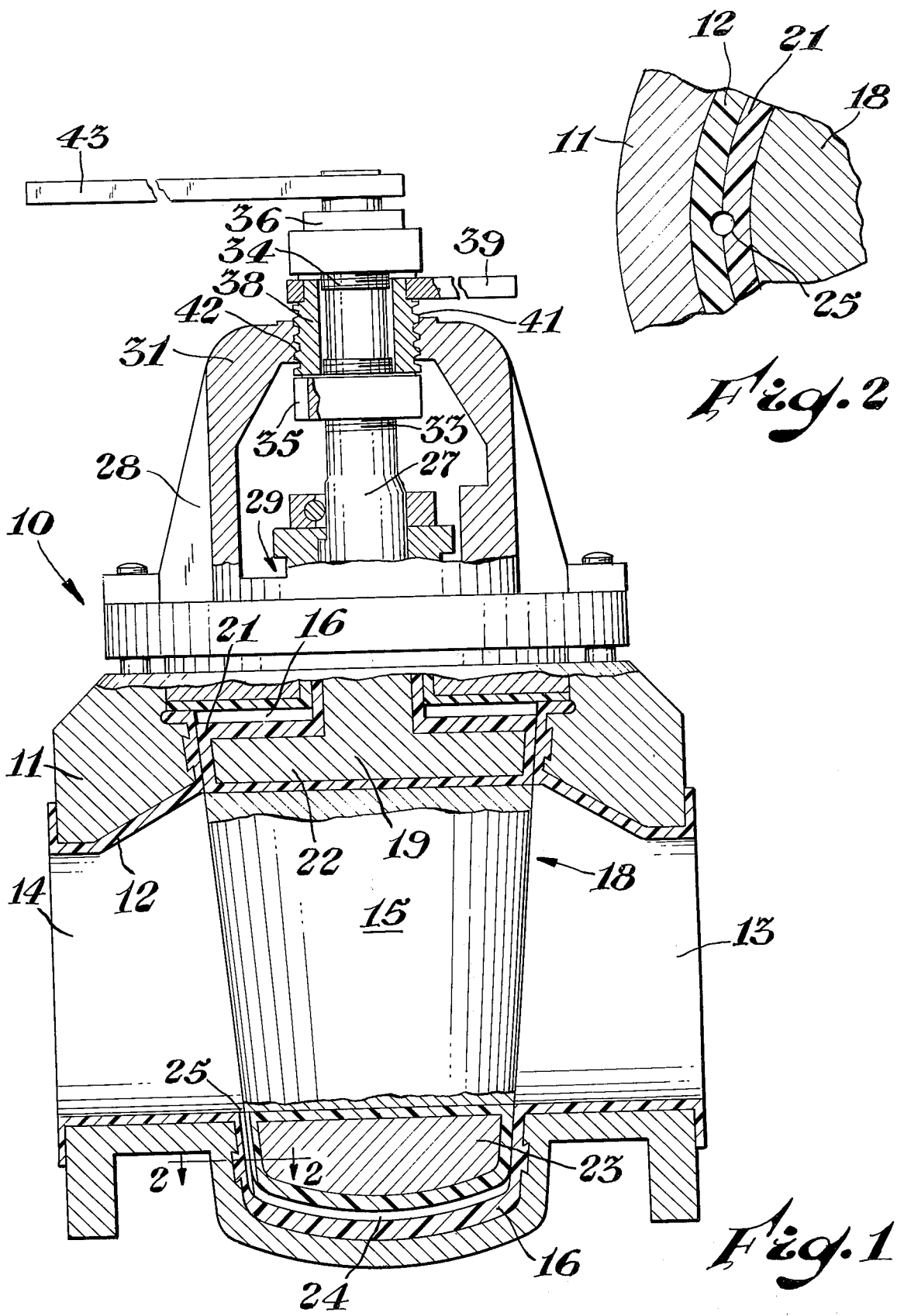
FIG. 1 depicts a sectional view of a plug valve in accordance with the present invention.
FIG. 2 is a fractional sectional view of a portion of the valve of FIG. 1 taken along the line 2—2 thereof.

In FIG. 1, there is depicted a partly-in-section view of a rising-plug plug valve generally in accordance with the present invention, the valve being generally designated by the reference numberal 10. The valve 10 has a valve body 11. The valve body 11 has a plastic liner 12. The body 11 defines a first or inlet opening 13 and a second outlet opening 14. A passageway 15 is defined by the body 11 and provides full communication between the inlet 13 and the outlet 14. The body 11 defines a plug receiving cavity 16 having a generally frustoconical configuration and intersects the passageway 15. A plug 18 is disposed within the cavity 16. The plug 18 comprises an inner or body portion 19 and an external or protective portion 21. Beneficially, the portion 21 is of a plastic material as employed for the liner 12 such as polytetrafluoroethylene, polypropylene or the like. The plug 18 has a first end 22 which has first end of major diameter and a second end 23 of minor diameter. The minor diameter end 23 and the adjacent portion of the body 11 define a cavity 24 of generally dished configuration. A passageway 25 extends from the passage 15 at a location adjacent the outlet 14 to the dished cavity 24. The passageway 25 is partially defined by the body liner 12 and the plastic coating 21 of the plug 18. The plug 18 has a stem 27 extending outwardly from the body 12. The valve 10 has a bonnet 28 affixed thereto. The bonnet 28 carries a packing gland generally designated by the reference numeral 29, and a yoke portion 31 remotely disposed from the plug receiving cavity 16. The stem 27 has first and second threaded portions 33 and 34 respectively. A threaded collar 35 engages the threads 33 and a second threaded collar 36 engages the threads 34. The collars 35 and 36 are employed to adjust the plug in relation to the seat. A threaded bushing 38 is rotatably mounted between the collars 35 and 36. The bushing 38 is provided with a handle 39. The bushing 38 has an external thread 41 which is in threadable engagement with an internal thread 42 on the yoke 31. The stem 27 is rigidly affixed to a handle or acuating means 43.

In FIG. 2, there is schematically depicted a fractional sectional view of a portion of the valve 10 of FIG. 1 taken along the line 2—2 thereof the cross-section view of a portion of the body 11 shows a liner 12, the plug 18 and coating 21. The passage 25 is defined by semicircular grooves in the liner 12 and the coating 21.

In operation of the valve in accordance with the present invention, rotation of the handle 39 serves to either force the plug 18 into engagement with the mating inner surface of the body 11 or lift the plug slightly from the plug receiving cavity 16. When in the raised position, the plug may be rotated by means of the handle 43 with minimal effort. As the plug is raised and the plug either rotated to the closed position or rotated from the closed position to the open position, liquid entering the inlet 13 is forced downwardly about the periphery of the plug 18 into the dished cavity 24 and from the cavity 24 by means of the passageway 25 carrying with it at least a major portion of solids in the space disposed between the plug and the adjacent surface of the valve body 11. Thus each time the valve is opened or closed, the sealing surface of the valve adjacent its second end or end of minor diameter the seating surfaces of the valve adjacent its second end or end of minor diameter the seating surfaces are flushed by liquid passing thereover. A valve of the present invention is particularly desirable in instances where minor amounts of solids are present in the liquid being handled by the valve. The present invention is readily applicable to rising-plug plug valves whether they be of a lined variety or of metal, glass or ceramic construction.

The present invention does not solve all the problems associated with particulate solids flowing within a valve but relieves considerably problems arising from the accumulation of sediment and other finely divided solids which often occur in flowing liquids. Generally, the size of the passage is desirably from about 1–4 millimeters for most valves up to about 6 inches in diameter and proportionately larger for larger valves.

Generally, the particulate material which is readily flushed through such passages will have a maximum dimension of from about 50–100 microns. Employing valves in accordance with the present invention, substantially reduced abrasion is observed on the sealing surfaces adjacent the smaller diameter end of the plug and the associated sealing surface of the body portion.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the here-to-appended claims.

What is claimed is:

1. In an improved rising-plug plug valve comprising
a valve body, the valve body defining
an inlet opening,
an outlet opening and
a passage therein, the passage providing full communication between the inlet opening and the outlet opening, the valve body defining
a plug receiving cavity having a generally frustoconical configuration, the plug receiving cavity intersecting the passageway between the inlet and the outlet,
a plug disposed within the plug receiving cavity, the plug having a general frustoconical configuration and mating with at least a portion of the walls of the plug receiving cavity, the plug defining
a fluid passageway which on rotation of the plug permits selective communication between the inlet and the outlet end, the plug having
an end of major diameter and
an end of minor diameter, the plug and valve body at the plug end of minor diameter defining
a closed cavity,
a means to selectively position the plug in the sealing engagement with the walls defining the plug receiving cavity and means to rotate the plug,
the improvement which comprises providing a groove in a surface extending between the cavity defined by the plug and the body and the outlet passageway to thereby provide fluid communication between the cavity defined by the plug and the body and the outlet passageway.

2. The valve of claim 1 wherein the valve body is plastic lined.

3. The valve of claim 2 wherein the valve plug is plastic lined.

4. In an improved plastic lined rising-plug plug valve comprising
a valve body having a lining of a plastic material, the valve body defining
an inlet opening,
an outlet opening and
a passage therein, the passage providing full communication between the inlet opening and the outlet opening, the valve body defining
a plug receiving cavity having a generally frustoconical configuration, the plug receiving cavity intersecting the passageway between the inlet and the outlet,
a plug having a lining and coating of a plastic material, the plug being disposed within the plug receiving cavity, the plug having a general frustoconical configuration and mating with at least a portion of the walls of the plug receiving cavity, the plug defining
a fluid passageway which on rotation of the plug permits selective communication between the inlet and the outlet end, the plug having
an end of major diameter and
an end of minor diameter, the plug and valve body at the plug end of minor diameter defining
a closed cavity,
a means to selectively position the plug in the sealing engagement with the walls defining the plug receiving cavity and means to rotate the plug,,
the improvement which comprises providing a groove in the plastic material between the cavity defined by the plug and the body and the outlet passageway thereby providing fluid communication between the cavity defined by the plug and the body and the outlet passageway.

5. In an improved rising-plug plug valve comprising
a valve body, the valve body defining
an inlet opening,
an outlet opening and
a passage therein, the passage providing full communication between the inlet opening and the outlet opening, the valve body defining
a plug receiving cavity having a generally frustoconical configuration, the plug receiving cavity intersecting the passageway between the inlet and the outlet,
a plug disposed within the plug receiving cavity, the plug having a general frustoconical configuration and mating with at least a portion of the walls of the plug receiving cavity, the plug defining
a fluid passageway which on rotation of the plug permits selective communication between the inlet and the outlet end, the plug having
an end of major diameter and
an end of minor diameter, the plug and valve body at the plug end of minor diameter defining
a closed cavity
a means to selectively position the plug in the sealing engagement with the walls defining the plug receiving cavity and means to rotate the plug,
the improvement which comprises a passageway between the cavity defined by the plug and the body and the outlet passageway, thereby providing fluid communication between the cavity defined by the plug and the body and the outlet passageway wherein the passageway is defined by mating grooves of the valve body and plug.

* * * * *